(12) United States Patent
Moriya

(10) Patent No.: US 11,457,189 B2
(45) Date of Patent: Sep. 27, 2022

(54) DEVICE FOR AND METHOD OF CORRECTING WHITE BALANCE OF IMAGE

(71) Applicant: SAMSUNG ELECTRONICS CO., LTD., Suwon-si (KR)

(72) Inventor: Tsuyoshi Moriya, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 208 days.

(21) Appl. No.: 16/904,707

(22) Filed: Jun. 18, 2020

(65) Prior Publication Data
US 2020/0404235 A1 Dec. 24, 2020

(30) Foreign Application Priority Data

Jun. 20, 2019 (JP) .............................. JP2019-114464
May 14, 2020 (KR) ......................... 10-2020-0057818

(51) Int. Cl.
*H04N 9/73* (2006.01)
*H04N 9/07* (2006.01)
(Continued)

(52) U.S. Cl.
CPC ............ *H04N 9/735* (2013.01); *H04N 9/07* (2013.01); *H04N 5/225* (2013.01); *H04N 5/30* (2013.01)

(58) Field of Classification Search
CPC .......... H04N 9/735; H04N 5/225; H04N 5/30; H04N 9/07; H04N 9/73; H04N 9/04; H04N 17/02
See application file for complete search history.

(56) References Cited

U.S. PATENT DOCUMENTS

| 9,578,247 B2 | 2/2017 | Nishida | |
|---|---|---|---|
| 2005/0018226 A1* | 1/2005 | Chiba | H04N 1/6033 358/1.9 |

(Continued)

FOREIGN PATENT DOCUMENTS

| JP | 2006254309 A | * | 9/2006 |
|---|---|---|---|
| JP | 4102983 B2 | | 6/2008 |

(Continued)

OTHER PUBLICATIONS

Sunita Nayak, "Understanding AlexNet", Learn OpenCV, Published Jun. 13, 2018, Total 12 pages, URL: https://www.learnopencv.com/understanding-alexnet/.

*Primary Examiner* — Abdelaaziz Tissire
(74) *Attorney, Agent, or Firm* — Sughrue Mion, PLLC

(57) ABSTRACT

An electronic device includes a camera configured to capture an image and generate an electrical image signal by photoelectrically converting incident light, and at least one processor configured to estimate a light source color temperature based on image data of the image signal, identify a target coordinate on a color space based on the light source color temperature, identify a capture coordinate on the color space based on the image, identify a chrominance allowable range based on the target coordinate, obtain a white balance evaluation value based on a first distance between the target coordinate and the chrominance allowable range and a second distance between the capture coordinate and the chrominance allowable range, and perform a white balance correction on the image based on the white balance evaluation value.

19 Claims, 10 Drawing Sheets

(51) Int. Cl.
*H04N 5/225* (2006.01)
*H04N 5/30* (2006.01)

(56) References Cited

U.S. PATENT DOCUMENTS

| | | | | |
|---|---|---|---|---|
| 2005/0128316 A1* | 6/2005 | Sugimori | ............... | H04N 9/735 348/223.1 |
| 2005/0213128 A1* | 9/2005 | Imai | ............... | H04N 9/73 358/1.9 |
| 2006/0093211 A1* | 5/2006 | Matsuura | ............... | H04N 1/6058 382/162 |
| 2006/0170942 A1* | 8/2006 | Chiba | ............... | H04N 1/6033 358/1.9 |
| 2009/0046171 A1* | 2/2009 | Kogan | ............... | H04N 1/62 382/167 |
| 2009/0067683 A1* | 3/2009 | Takayama | ............... | H04N 1/6077 382/167 |
| 2009/0097745 A1* | 4/2009 | Kim | ............... | H04N 9/73 382/167 |
| 2009/0167892 A1* | 7/2009 | Takayama | ............... | H04N 9/735 348/223.1 |
| 2010/0020193 A1* | 1/2010 | Zhang | ............... | G06T 5/009 382/167 |
| 2010/0214434 A1* | 8/2010 | Kim | ............... | H04N 9/73 348/E9.051 |
| 2010/0214435 A1* | 8/2010 | Chang | ............... | H04N 9/735 348/E9.051 |
| 2010/0259686 A1* | 10/2010 | Kao | ............... | H04N 9/73 348/658 |
| 2011/0187891 A1* | 8/2011 | Zhang | ............... | H04N 9/73 348/E9.051 |
| 2013/0057726 A1* | 3/2013 | Shimizu | ............... | H04N 9/643 348/224.1 |
| 2013/0128073 A1* | 5/2013 | Seok | ............... | H04N 9/735 348/223.1 |
| 2016/0364602 A1* | 12/2016 | Kim | ............... | G06V 10/60 |
| 2018/0115757 A1* | 4/2018 | Chuang | ............... | H04N 1/6086 |
| 2018/0177434 A1* | 6/2018 | Kim | ............... | A61B 5/6898 |

FOREIGN PATENT DOCUMENTS

| | | | | |
|---|---|---|---|---|
| JP | 2011139489 A | * | 7/2011 | ............ H04N 9/735 |
| JP | 6286944 B2 | | 3/2018 | |
| KR | 10-0982762 B1 | | 9/2010 | |

* cited by examiner

DEVICE FOR AND METHOD OF CORRECTING WHITE BALANCE OF IMAGE

CROSS-REFERENCE TO RELATED APPLICATIONS

This application is based on and claims priority under 35 U.S.C. § 119 to Japanese Patent Application No. 2019-114464, filed on Jun. 20, 2019, in the Japanese Patent Office, and to Korean Patent Application No. 10-2020-0057818, filed on May 14, 2020, in the Korean Intellectual Property Office, the disclosures of which are incorporated by reference herein in their entireties.

BACKGROUND

1. Field

The disclosure relates to devices for and methods of correcting white balance of an image, and more particularly, an electronic device, an image processing method, and a computer-readable storage medium for storing computer programs for executing the image processing method.

2. Description of Related Art

In an electronic photographing device, such as a digital camera, for electronically capturing an image of an object, an image signal process (white balance correcting process) for correcting white balance is generally performed, such that a white object may be photographed to be white regardless of a light source of an illumination. When a white balance correcting process is performed on a captured image, a difference occurs between colors of an object image observed with the naked eyes and an object in a captured image, according to an illumination light source. In particular, in a correcting process for reproducing a white object to be white, there is a difference between the color of the object visible to the naked eyes and the color of the object in the captured image. For example, there is a difference between color temperatures of natural light, such as sunlight and artificial light (e.g., a fluorescent lamp), and thereby largely affecting a white reproducibility of the captured image. Therefore, when the white balance correcting process is performed, a sense of discomfort may occur in an image reproduced by the photographing device.

SUMMARY

Provided are an electronic device, an image processing method, and a storage medium for storing computer programs, which provide a natural white balance correcting process according to a light source.

Provided are an electronic device, an image processing method, and a storage medium for storing computer programs, which provide a white balance evaluation method for reducing a gap between objective evaluation and subjective evaluation on a white balance correction result to improve quality of a white balance correcting process.

According to an embodiment, there is provided an electronic device including: a camera configured to capture an image and generate an image signal by photoelectrically converting incident light; and at least one processor configured to: estimate a light source color temperature based on image data of the image signal, identify a target coordinate on a color space based on the light source color temperature, identify a capture coordinate on the color space based on the image, identify a chrominance allowable range based on the target coordinate, obtain a white balance evaluation value based on a first distance between the target coordinate and the chrominance allowable range and a second distance between the capture coordinate and the chrominance allowable range, and perform a white balance correction on the image based on the white balance evaluation value.

The chrominance allowable range is a region in the color space, where the target coordinate is in the chrominance allowable range. The at least one processor is further configured to identify a straight line connecting the target coordinate and the capture coordinate, and obtain the first distance between the target coordinate and the chrominance allowable range and the second distance between the capture coordinate and the chrominance allowable range on the straight line.

The at least one processor is further configured to obtain the white balance evaluation value based on a ratio of the second distance to the first distance.

The at least one processor is further configured to: identify a reference region in the image, and estimate the light source color temperature based on image data of the reference region.

The reference region is an achromatic region in the image including an achromatic color patch.

The chrominance allowable range is identified such that a first diameter in a blue direction and an amber direction is longer than a second diameter in a light green direction and a magenta direction in the color space.

The chrominance allowable range is identified in different ranges depending on the light source color temperature.

The at least one processor is further configured to, based on the chrominance allowable range being identified, identify, based on the target coordinate, a distance in the amber direction, a distance in the magenta direction, a distance in the blue direction, and a distance in the light green direction.

The chrominance allowable range is identified by reflecting a plurality of evaluation scores with respect to white balance of the image.

The color space comprises a CIE LAB color space including an L* axis corresponding to a reflectivity, an a* axis corresponding to a red direction and a green direction, and a b* axis corresponding to a yellow direction and a blue direction.

The at least one processor is further configured to identify whether a color of each region in the image is one from among an object color and a light source color, and perform the white balance correction based on the color of each region being one from among the object color and the light source color.

The at least one processor is further configured to: divide the image into a plurality of blocks, identify a type of an object in each of the plurality of blocks, perform clustering to form at least one class corresponding to the type of the object, and identify a white balance parameter value based on the white balance evaluation value and the at least one class.

The at least one processor is further configured to identify whether the capture coordinate is in the chrominance allowable range. Based on identifying that the capture coordinate is in the chrominance allowable range, the at least one processor is configured to identify the white balance evaluation value as 0, and based on identifying that the capture coordinate is out of the chrominance allowable range, the at least one processor is configured to obtain the white balance evaluation value based on the first distance between the target coordinate and the chrominance allowable range and the second distance between the capture coordinate and the chrominance allowable range.

According to an embodiment, there is provided an image processing method including: estimating a light source color temperature based on image data of an image captured by a camera; identifying a target coordinate on a color space based on the light source color temperature; identifying a capture coordinate on the color space based on the image; identifying a chrominance allowable range based on the target coordinate; obtaining a white balance evaluation value based on a first distance between the target coordinate and the chrominance allowable range and a second distance between the capture coordinate and the chrominance allowable range; and performing a white balance correction on the image based on the white balance evaluation value.

The chrominance allowable range is a region in the color space, the target coordinate is in the chrominance allowable range, and the image processing method further includes identifying a straight line connecting the target coordinate and the capture coordinate and obtaining the first distance between the target coordinate and the chrominance allowable range and the second distance between the capture coordinate and the chrominance allowable range on the straight line.

The obtaining the white balance evaluation value includes identifying the white balance evaluation value based on a ratio of the second distance to the first distance.

The estimating the light source color temperature includes: identifying a reference region in the image, and estimating the light source color temperature based on image data of the reference region.

The reference region is an achromatic region in the image including an achromatic color patch.

The chrominance allowable range is identified such that a first diameter in a blue direction and an amber direction is longer than a second in a light green direction and a magenta direction in the color space.

According to an embodiment, there is provided a non-transitory computer-readable storage medium having stored therein a computer program for executing an image processing method, when executed by a processor, the processor is configured to: estimate a light source color temperature based on image data of an image captured by a camera; identify a target coordinate on a color space based on the light source color temperature; identify a capture coordinate on the color space based on the image; identify a chrominance allowable range based on the target coordinate; obtain a white balance evaluation value based on a first distance between the target coordinate and the chrominance allowable range and a second distance between the capture coordinate and the chrominance allowable range; and perform a white balance correction on the image based on the white balance evaluation value.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
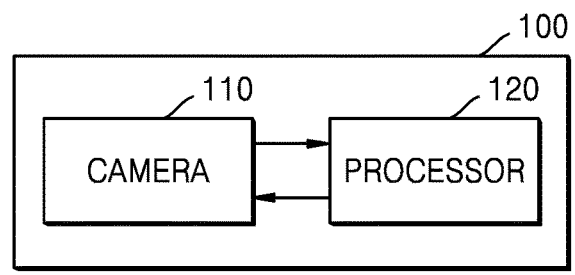
FIG. 1 is a block diagram of an electronic device according to an embodiment.

The disclosure describes and discloses principles of one or more embodiments so as to clarify the scope of claims and enable one of ordinary skill in the art to implement the embodiments of the disclosure described in claims. The embodiments of the disclosure may be implemented in various types.

In the disclosure, like reference numerals denote the same elements. The disclosure does not explain all of the elements of the embodiments, and content common in the technical field to which the embodiments of the disclosure belongs or same content among the embodiments of the disclosure will be omitted. In the embodiments, terminologies 'module' or 'unit' may be implemented by one or combination of two or more of hardware, software, and firmware, a plurality of 'modules' or 'units' may be implemented as one element, or one 'module' or 'unit' may include a plurality of elements.

The expression "at least one of a, b or c" indicates only a, only b, only c, both a and b, both a and c, both b and c, all of a, b, and c, or variations thereof.

In the disclosure, certain detailed explanations of related art may be omitted when it is deemed that they may unnecessarily obscure the essence of the embodiments of the disclosure. In addition, numbers (e.g., first, second, etc.) used herein is only an identifier for distinguishing one component from another.

In addition, when an element is referred to as being "connected to" another element, it is to be understood that the element may be directly connected to the other element, but may be connected or connected via another element in the middle, unless otherwise indicated.

Various embodiments of the disclosure will be described with reference to the accompanying drawings.

In addition, the term 'image' may include a still image, a video composed of a plurality of consecutive still images (or frames), or a video.

FIG. 1 is a block diagram of an electronic device 100 according to an embodiment.

The electronic device 100 may include a camera 110 and a processor 120. The electronic device 100 may be implemented in various forms such as a mobile device, a communication terminal, a wearable device, a smart phone, a tablet PC, a laptop computer, and a desktop PC.

The camera 110 may photoelectrically convert incident light to generate a detection signal. The camera 110 may include an image sensor that photoelectrically converts the incident light. The camera 110 may process the detection signal generated by the image sensor and output the detection signal to the processor 120. As an example, the camera 110 outputs the detection signal of the image sensor to the processor 120 in the form of an analog signal, and the processor 120 may obtain a digital detection signal after performing an analog-to-digital conversion process on the detection signal. In another example, the camera 110 may output the detection signal of the image sensor to the processor 120 in the form of a digital signal that has undergone the analog-to-digital conversion in the camera 110. Also, the camera may output the detection signal to another component to perform an analog-to-digital conversion and such component may output the converted detection signal to the processor 120.

The image sensor may generate a detection signal corresponding to each of one or more color components. For example, the image sensor may generate detection signals respectively corresponding to red, green, and blue. The color component of the detection signal generated by the image sensor is determined according to a color filter and a detection signal transfer path included in the image sensor. The camera 110 may include a plurality of signal channels corresponding respectively to the color components. The processor 120 may receive a detection signal corresponding to each color component for one frame.

The camera 110 may be implemented as a photographing unit having various types of photographing functions. The camera 110 may be built in the electronic device 100 or may be detachably implemented. Also, the electronic device 100 may include one or more cameras 110. For example, the electronic device 100 may include dual cameras, triple cameras, etc. The camera 110 may include a plurality of optical systems for three-dimensional (3D) imaging. Also, the electronic device 100 may include the cameras 110 on different surfaces thereof. For example, the electronic device 100 may include a front camera in a front surface of the electronic device, and a rear camera in a rear surface thereof. The front surface of the electronic device 100 may be defined as a surface in which a display of the electronic device 100 is located.

According to an embodiment, the camera 110 may include a lens, a shutter, an aperture stop, an image sensor, a signal amplifier, and an analog-digital converter. Also, the camera 110 may further include a processor for processing a digital signal. The camera 110 may include a drive circuit that controls components in the camera 110 based on a control signal received from the processor 120. For example, the camera 110 may include a lens drive circuit, a shutter drive circuit, a signal amplifier drive circuit, etc. Such above one or more drive circuits may be configured separately or integrally with each other, and various combinations of drive circuits may be included in the camera 110.

The processor 120 controls overall operations of the electronic device 100. The processor 120 may include at least one processor. The processor 120 may perform an operation by executing an instruction or a command stored in a memory in advance. Also, the processor 120 may determine or identify values, and a result of a determination, etc.

The processor 120 may generate a captured image from a detection signal input from the camera 110. The processor 120 may generate the captured image by performing processes, such as a color coordinate conversion, a noise treatment, a contract correction, a white balance correction, a gamma correction, an interpolation process, a resolution adjustment, etc. on the detection signal input from the camera 110. The processor 120 may generate a still image or a video including a plurality of frames from the detection signal.

The white balance correction is a process of adjusting a color balance by correcting a color sense of reflected light when obtaining an image by the camera. When capturing images by the camera, there is a variation in color expression according to light. When a color temperature is low, an obtained image is reddish, and when the color temperature is high, the obtained image is bluish. For example, the object may be expressed in red under an incandescent light, may be expressed in green under a fluorescent light, and may have different color temperature according to time under the sunlight. In order to correct the variation in the color sense according to the light source, the processor 120 may perform a white balance correcting process. The processor 120 may perform the white balance correcting process by adjusting a gain with respect to each of red (R), green (G), and blue (B) in the obtained image. According to an embodiment, the processor 120 may provide an auto white balance (AWB) function or mode in which the white balance is corrected by using a captured image of white paper or a white object. The processor 120 may automatically correct the color temperature and the color sense by the AWB.

According to an embodiment, the processor 120 estimates a light source color temperature of the obtained image, and calculates or obtains a white balance evaluation value based on the light source color temperature. The light source color temperature denotes a color temperature of the light source when the obtained image is captured. The white balance evaluation value is a value indicating a white balance of the current obtained image in order to correct the white balance of the obtained image. According to embodiments, the white balance evaluation value may be determined based on a geometric distance between a target coordinate of the white balance correction and a capture coordinate, which is a coordinate of a color appearing in an obtained image in a color space. The processor 120 performs the white balance correcting process based on the white balance evaluation value. For example, the processor 120 may adjust an intensity of the white balance correction, a target color temperature, etc. based on the white balance evaluation value.

The processor 120 may convert the obtained image into a color coordinate in a certain color space. According to an embodiment, the processor 120 may convert the obtained image into a CIE LAB color space. The CIE LAB color space is a color space defined by CIE based on opposite colors such as yellow-blue and green-red in terms of human sensibility, which have been discovered as a result of research to learn human sensibility. The CIE LAB color space is globally used because the CIE LAB color space makes it easy to guess an error range and direction of colors when making colors. The CIE LAB color space may have three color coordinates, e.g., $L^*$, $a^*$, and $b^*$. The coordinate $L^*$ denotes a reflectivity of lightness that is the same as human vision, has grades from 0 to 100, and may be expressed in a decimal point unit. The coordinate $a^*$ denotes a chromaticity diagram, and a positive direction corresponds to red and a negative direction corresponds to green. The coordinate b* denotes a chromaticity diagram, and a positive direction corresponds to yellow and a negative direction corresponds to blue.

The processor 120 may convert the obtained image into the CIE LAB color space, and determine a target coordinate and a chrominance allowable range based on the light source color temperature in the CIE LAB color space. Also, the processor 120 may determine a capture coordinate based on image data of the obtained image. Based on the determined target coordinate, the capture coordinate and the chrominance allowable range, the processor 120 may calculate the white balance evaluation value and correct the white balance of the obtained image based on the white balance evaluation value.

According to an embodiment, the processor 120 may convert the obtained image into other color spaces such as YCbCr, HSV, HLS, etc. instead of the LAB color space. However, the embodiments of the disclosure are not limited thereto, and may be applied to different color spaces, provided that the colors that are easy to allow for humans to recognize and colors that are difficult for humans to recognize may be discriminated in the color coordinate space.

The processor 120 controls the camera 110, determines a parameter value applied to the camera 110 and outputs the parameter value to the camera 110. The processor 120 generates control signals such as a shutter release signal, a parameter setting signal, etc., and outputs the control signals to the camera 110. The control signals output to the camera 110 may be determined based on the user input, or may be automatically determined according to a process such as auto focusing (AF) control, auto exposure (AE) control, etc. performed in the processor 120. The processor 120 may perform the processes such as AF or AE based on an input image generated from a detection signal and may control the camera 110 accordingly.

The processor 120 performs the AE process based on an input image and controls a value of a parameter related to the exposure of the camera 110. The parameter related to the exposure may include, for example, at least one of a shutter speed, an aperture value, an exposure time, an EV value, or a gain, or a combination thereof.

The electronic device 100 may additionally include various components such as a memory, a display, a flash light, an input/output interface, or a communicator, in addition to the camera 110 and the processor 120 shown in FIG. 1.

Figure 2:
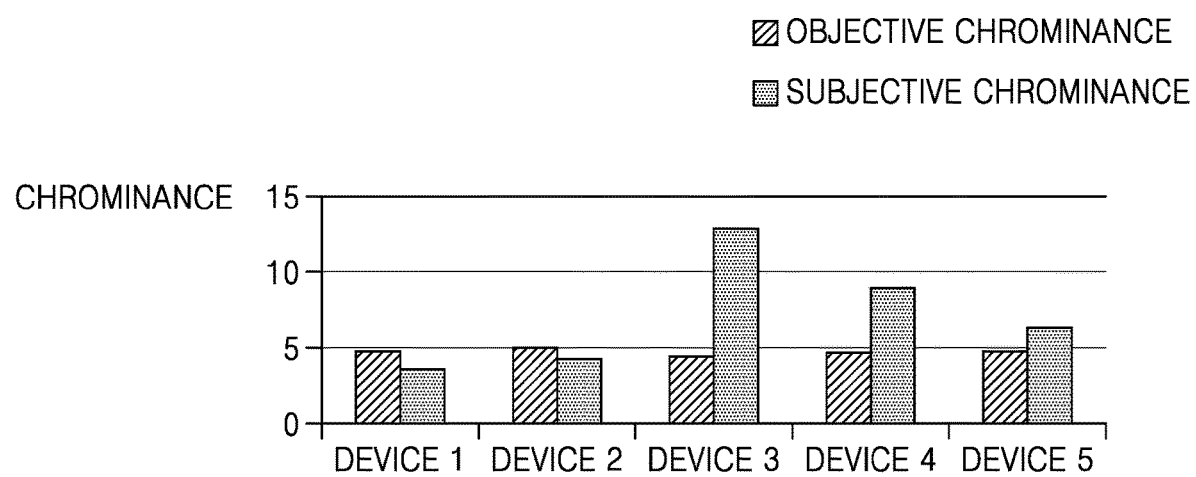
FIG. 2 is a graph showing objective chrominance and subjective chrominance recognized by a plurality of devices according to an embodiment.

FIG. 2 is a graph showing objective chrominance and subjective chrominance recognized by a plurality of devices according to an embodiment. The chrominance is a numerical expression of a perceptual difference between two perceived colors. For example, the chrominance may be represented as a geometric distance between two points in the LAB color space. In the LAB space, the chrominance (Δc) may be expressed by Equation 1 below.

$$\Delta c(L^*, a^*, b^*) = \{(\Delta L^*)^2 + (\Delta a^*)^2 + (\Delta b^*)^2\}^{1/2} \quad (1)$$

In color recognition, a person is more sensitive to a chrominance appearing in hues of magenta and green directions than in hues of blue and amber (orange) directions. For example, in an image obtained by photographing evening glow, amber color combination may be preferred so as to express the feeling of glow, and in an image of evening dusk at sunset, color combination close to blue may be preferred. As described above, because the numerical evaluation on the chrominance and the objective evaluation on the chrominance do not match, it is difficult to provide the white balance correction that a person feels natural only with the numerical evaluation.

In order to grasp a difference between an objective chrominance and a subjective chrominance, as shown in FIG. 2, chrominance of images were compared, where the images show the results of white balance correction performed with respect to a captured image in devices 1 to 5 that provide different white balance correction processes. As a comparison result, the chrominance values that are calculated by the chrominance formula of Equation 1 above in the five devices are similar to one another in the LAB color space. That is, the objective chrominance in the five devices are similar to one another. However, the chrominance subjectively recognized by a person were largely different from one another in the five devices. The devices 1 and 2 were evaluated to have a lower level of the subjective chrominance than that of the objective chrominance, but the devices 3, 4, and 5 were evaluated to have a much higher subjective chrominance than that of the objective chrominance. The above difference was caused due to directions of the chrominance on the LAB color space.

According to embodiments of the disclosure, in order to compensate for the limitation in the objective chrominance that is numerically evaluated by the chrominance formula, a target color temperature of the white balance correction is determined according to the light source color temperature estimated based on the captured image, and a chrominance allowable range defined according to the light source color temperature is variously set according to a direction of the color to calculate the white balance evaluation value. According to the embodiments, the subjective chrominance may be significantly reduced and natural white balance correction may be provided by using the above white balance evaluation value calculation method.

Figure 3:
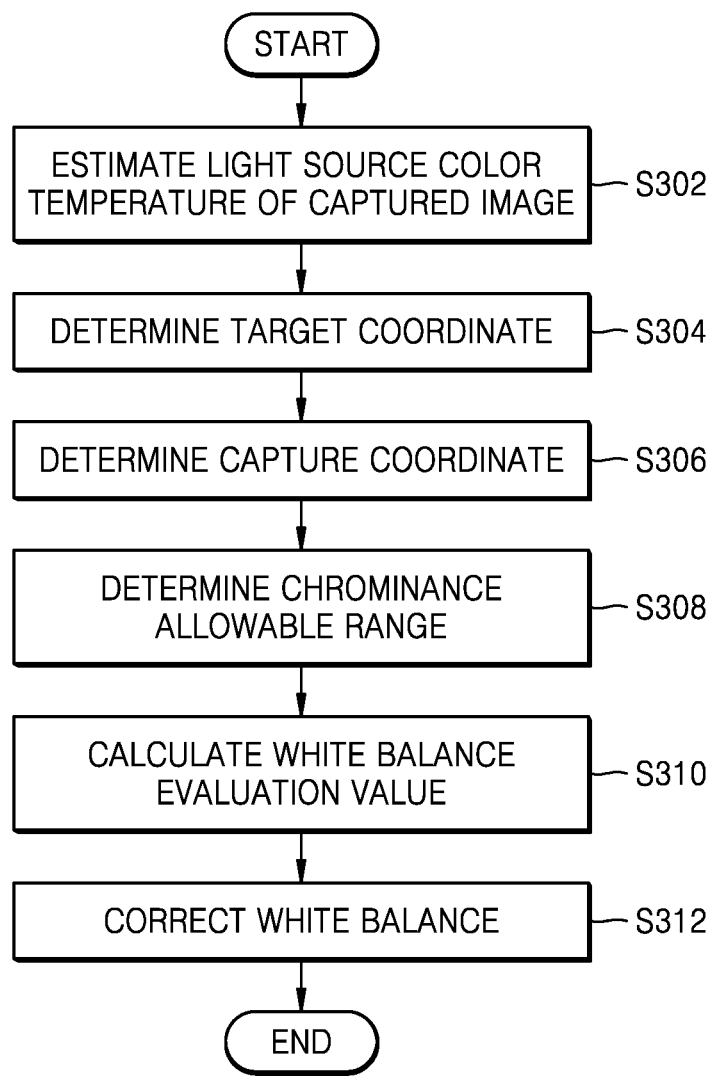
FIG. 3 is a flowchart for describing an image processing method according to an embodiment.

FIG. 3 is a flowchart for describing an image processing method according to an embodiment.

The image processing method of FIG. 3 may be executed by electronic devices of various types including a processor and a memory. Therefore, the embodiments of the disclosure described with respect to the electronic device 100 may be also applied to the image processing method, or vice versa. The image processing method according to the embodiments of the disclosure is not limited to be executed by the electronic device 100, but may be executed by various types of electronic devices.

The electronic device estimates a light source color temperature of a captured image (S302). The captured image may include at least one of an image captured by the camera in the electronic device, an image input through an input interface, or an image stored in a memory, or a combination thereof. Specifically, processes of estimating the light source color temperature will be described with reference to FIG. 4.

Figure 4:
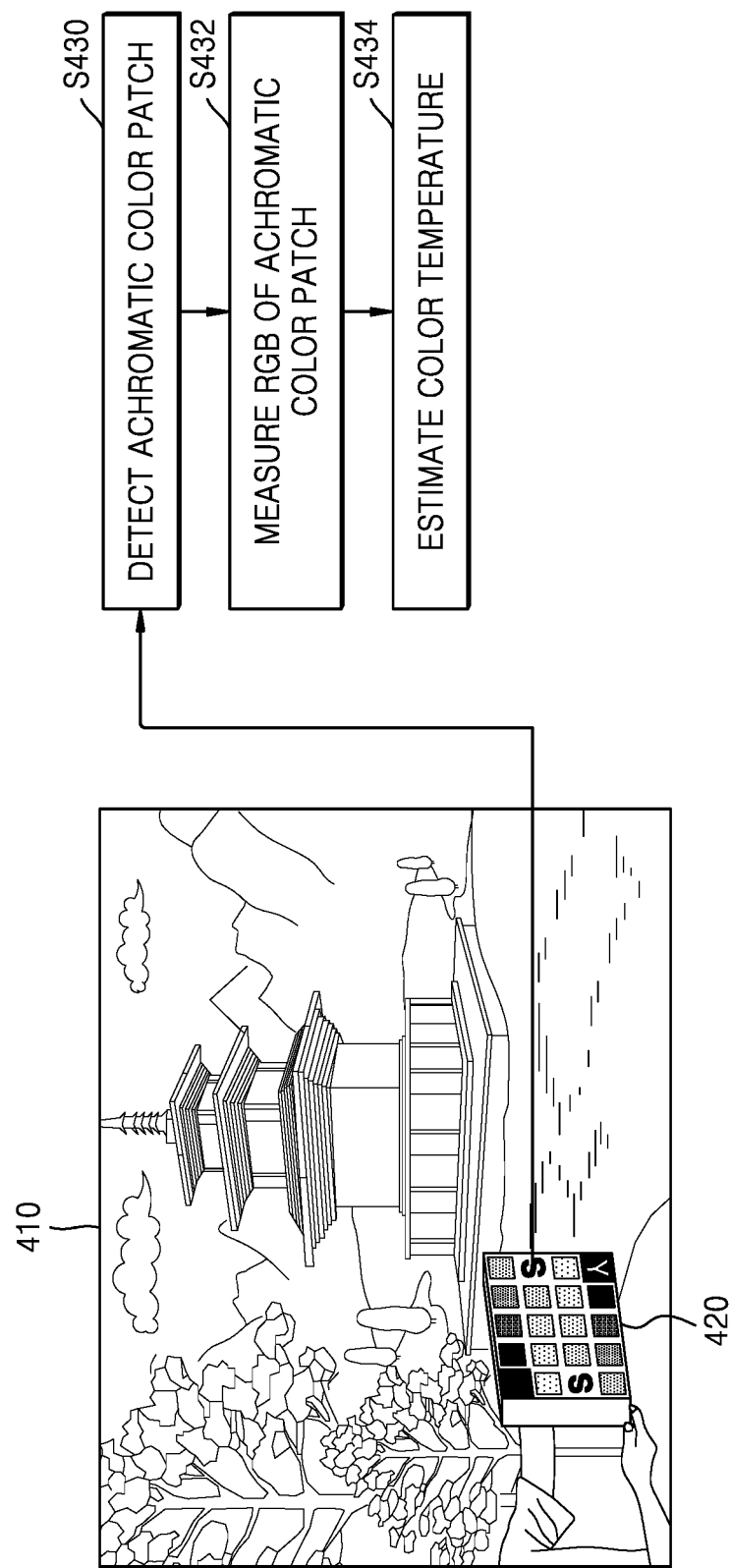
FIG. 4 is a diagram illustrating processes of estimating a color temperature of a light source according to an embodiment.

FIG. 4 is a diagram illustrating processes of estimating a color temperature of a light source, according to an embodiment.

According to an embodiment, the electronic device estimates the light source color temperature from image data of a captured image 410. The electronic device may estimate the light source color temperature from the captured image 410 including a reference region 420. The reference region 420 may be an achromatic region in the captured image. The reference region 420 may include an achromatic color patch or a region corresponding to an object having achromatic color (e.g., white paper).

The electronic device detects the achromatic color patch from the captured image 410 (S430). The reference region

420 may include the achromatic color patch defined in advance. The achromatic color patch is an object having a plurality of regions corresponding achromatic colors, and each of the plurality of regions has the achromatic color corresponding to a certain gray scale. The achromatic color patch includes an identifier defined in advance, and the electronic device may detect the achromatic color patch from the captured image by detecting the identifier included in the achromatic color patch.

The electronic device measures R, G, and B values from the image data of the reference region 420, the image data corresponding to the achromatic color patch (S432). The electronic device calculates R, G, and B values from the image data of the reference region 420.

The electronic device estimates the light source color temperature based on the R, G, and B values of the reference region 420 corresponding to the achromatic color patch (S434). Because the achromatic color patch has the achromatic color in the object itself, the color appearing in the achromatic color patch denotes the light source color temperature. The electronic device may estimate the color represented by the R, G, and B values of the achromatic color patch in the captured image as the light source color temperature.

Referring back to FIG. 3, the electronic device determines a target coordinate on the color space based on the light source color temperature of the captured image (S304). Also, the electronic device determines a capture coordinate on the color space based on the image data of the captured image (S306). The capture coordinate denotes a coordinate of the reference region 420 in the captured image 410 on the color space. The electronic device may define the capture coordinate by converting the R, G, and B values of the reference region 420 into color coordinates in the LAB color space. Also, the electronic device determines the chrominance allowable range based on the target coordinate (S308). The chrominance allowable range may be an ambient region of the target coordinate in the color space, that is, a range of the chrominance allowed from the target coordinate. The target coordinate is in the chrominance allowable range. FIG. 3 illustrates the processes in an order of the estimation of the light source color temperature in the captured image (S302), the determination of the target coordinate (S304), the determination of the capture coordinate (S306), and the determination of the chrominance allowable range (S308), but the order of the processes may vary depending on the embodiments of the disclosure. Operations S302, S304, and S308 may be sequentially performed, but operation S306, in which the capture coordinate is determined, may be performed in parallel with operations S302, S304, and S308, or may be performed in a different order from that of FIG. 3. Hereinafter, operations S302, S304, and S308 will be described in more detail with reference to FIGS. 5, 6A, and 6B.

Figure 5:
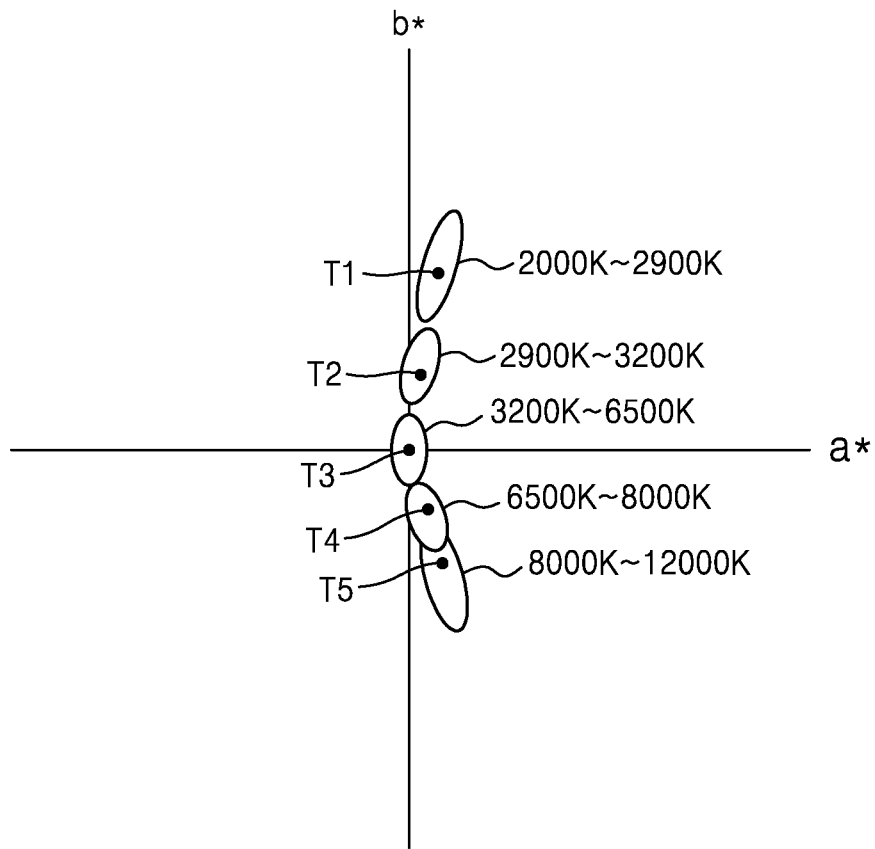
FIG. 5 is a graph showing a range of a target coordinate for each light source color temperature according to an embodiment.

FIG. 5 is a graph showing a range of a target coordinate for each light source color temperature, according to an embodiment.

In FIG. 5, ranges of target coordinates are shown for the light source color temperatures in the LAB color space. In FIG. 5, a horizontal axis denotes an a* axis, and a longitudinal axis denotes a b* axis. An L* axis representing the L* coordinate is omitted in the graph of FIG. 5. As shown in FIG. 5, the range of the target coordinate varies in the b* axis direction depending on the light source color temperature. The coordinate b* represents values between yellow and blue. That is, when the light source color temperature is decreased, the target coordinate range moves to a direction of yellow, and when the light source color temperature is increased, the target coordinate range moves to a direction of navy.

The electronic device stores target information for color temperature, including the target coordinate ranges for the light source color temperatures as shown in FIG. 5, in advance. Also, the electronic device estimates the light source color temperature from the captured image and determines the target coordinate based on the estimated light source color temperature and the target information for each color temperature. The target coordinate may be determined within each target coordinate range according to the color temperature. For example, when the estimated light source color temperature is within a range of about 2000K to about 2900K, a coordinate T1 is set as a target coordinate, when the estimated light source color temperature is within a range of about 2900K to about 3200K, a coordinate T2 is set as a target coordinate, when the estimated light source color temperature is within a range of about 3200K to about 6500K, a coordinate T3 is set as a target coordinate, when the estimated light source color temperature is within a range of about 6500K to about 8000K, a coordinate T4 is set as a target coordinate, and when the estimated light source color temperature is within a range of about 8000K to about 12000K, a coordinate T5 is set as a target coordinate.

According to an embodiment, the electronic device may determine the location of the target coordinate according to a white balance setting. The white balance setting indicates a degree of correction in the white balance correction. For example, there may be a setting for correcting white color to appear completely white or a setting for allowing the color of the light source to remain as captured in an image. The electronic device may set a coordinate value of the target coordinate differently according to the white balance setting.

Figure 6A:
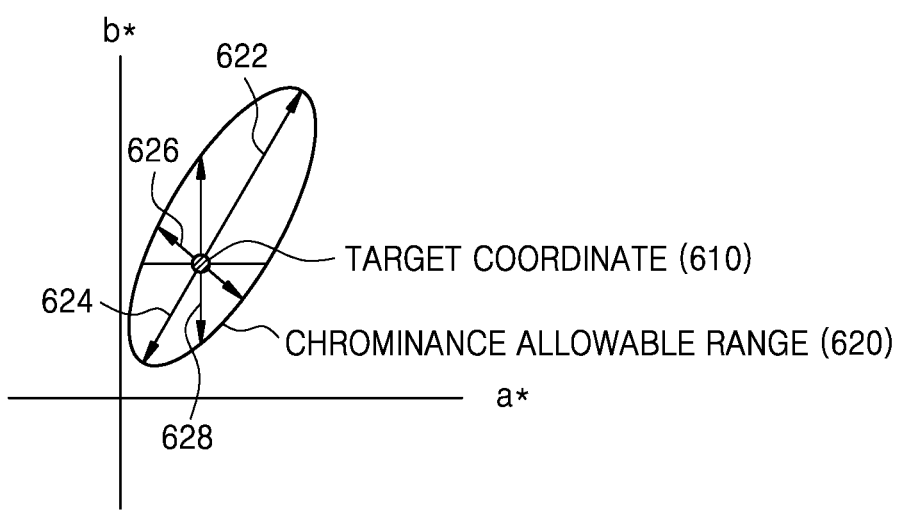
FIG. 6A is a diagram illustrating a process of determining a chrominance allowable range according to an embodiment.
Figure 6B:
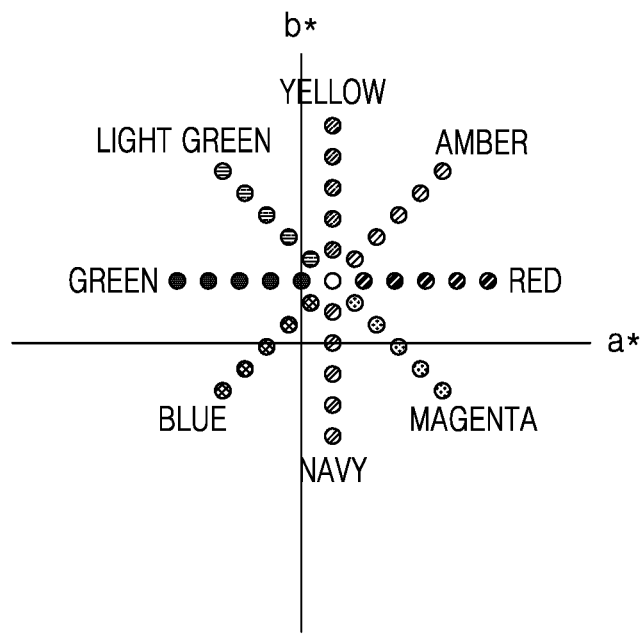
FIG. 6B is a diagram illustrating a region corresponding to each color in a color space according to an embodiment.

FIG. 6A is a diagram illustrating a process of determining a chrominance allowable range according to an embodiment. FIG. 6B is a diagram illustrating a region corresponding to each color in a color space according to an embodiment.

According to an embodiment, the electronic device determines a chrominance allowable range 620 based on a target coordinate 610. The chrominance allowable range 620 may be defined to have different distances from the target coordinate 610 according to directions in the color space. In the chrominance allowable range 620, diameters in a blue direction 624 and an amber direction 622 may be defined to be longer than diameters in a light green direction 262 and a magenta direction 628. That is, the chrominance allowable range 620 may be in the form of an ellipse as shown in FIG. 6A.

As shown in FIG. 6B, coordinates corresponding to each color may be defined in the color space. For example, coordinates corresponding to each color may be defined in the CIE LAB color space. According to an embodiment, based on the target coordinate 610, the chrominance allowable range 620 may be set to be narrower in the light green direction 626 and the magenta direction 628, in which a person's sensitivity to the chrominance is higher, and may be set to be wider in the blue direction 624 and the amber direction 622 in which a person's sensitivity to the chrominance may be lower.

FIG. 6B is a graph showing a white balance shift for a mean opinion score (MOS). FIG. 6B shows the white balance shift for MOS in the LAB color space. In FIG. 6B, a horizontal axis denotes an a* axis and a longitudinal axis denotes a b* axis. The target range is determined according to MOS, after preparing an image that is obtained by average-layer shifting a white balance of an image including a few different scenes in eight directions as shown in FIG. 6B and executing evaluation by a number of people. The chrominance allowable range may be determined according to a result of the evaluation by a number of people. A few different scenes are not necessarily the images to be evaluated. According to the evaluation performed by a number of people, the target range reflecting how far a person may subjectively tolerate a scene of different color temperatures may be determined. In order to designate the chrominance allowable range for each color from the above result, the chrominance allowable range may be set to be wider in the blue direction and the amber direction, and to be narrower in the light green direction, that is, an ultraviolet (UV) direction, and to be narrower in the magenta direction than in the light green direction. Thus, the chrominance allowable range reflecting the subjective perception of a human being may be defined.

As described above, by setting the chrominance allowable range differently according to the direction of color, the chrominance in the direction in which a person sensitively perceives the chrominance is evaluated to be greater and the chrominance in the direction in which a person less sensitively perceives the chrominance is evaluated to be lower. Thus, an intensity of the white balance correction is increased with respect to the chrominance in the direction in which a person sensitively recognizes the chrominance and is reduced in the direction in which a person less sensitively recognizes the chrominance. Thus, a natural white balance correction may be provided while reducing a color distortion from the original image.

According to an embodiment, the chrominance allowable range 620 may be defined in advance by defining a distance in a direction of each color from the target coordinate. For example, the chrominance allowable range 620 may be defined by distances from the target coordinate in the blue direction 624, in the amber direction 622, in the light green direction 622, and in the magenta direction 628. In this case, the electronic device may not have a separate criterion for each color coordinate, but may define the chrominance allowable range 620 by applying the distance in each direction set in advance to each color coordinate.

According to another embodiment, the distance in each direction of the chrominance allowable range 620 may be separately defined for each color coordinate. The chrominance allowable range 620 may be defined for each coordinate value, for each color temperature range, or may be defined by grouping each color coordinate with a predetermined range. The electronic device may store in advance information for defining the distances from the target coordinate in the blue direction 624, in the amber direction 622, in the light green direction 626, and in the magenta direction 628 from the target coordinate, for each coordinate value or range. For example, the electronic device may define the chrominance allowable range 620 with reference to a look-up table stored in advance.

Figure 7:
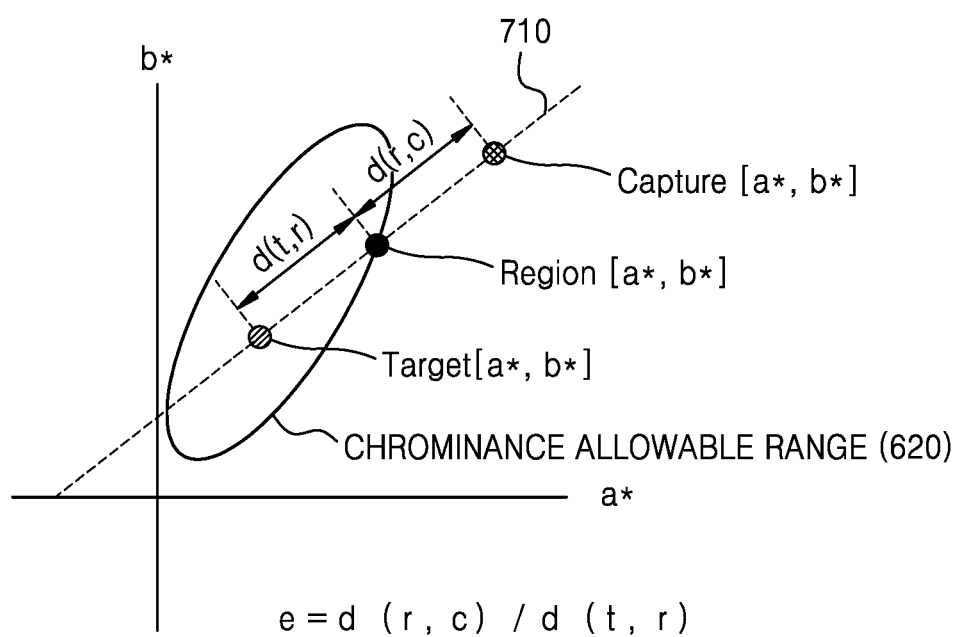
FIG. 7 is a diagram illustrating a process of calculating a white balance evaluation value according to an embodiment.
Figure 8:
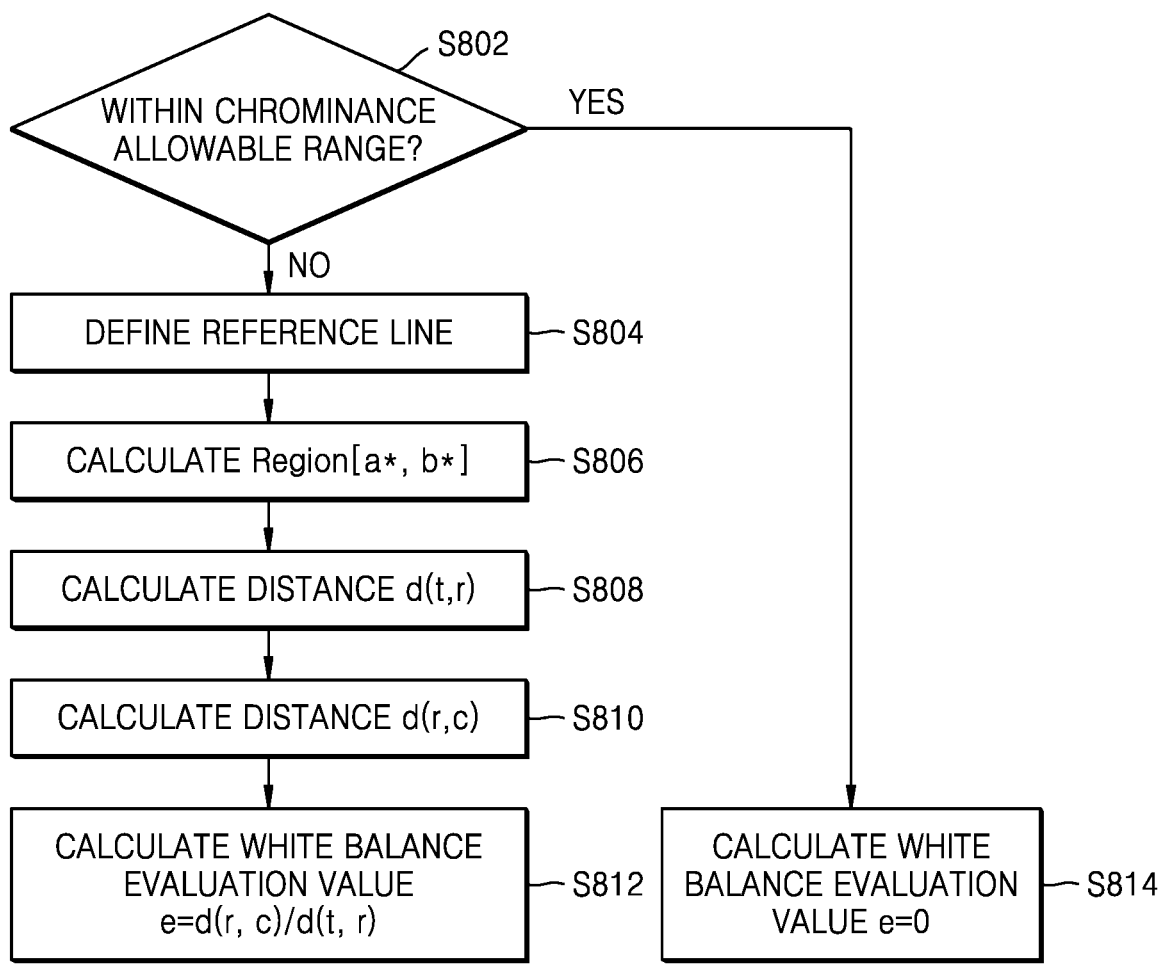
FIG. 8 is a flowchart for describing a process of calculating a white balance evaluation value according to an embodiment.

Referring back to FIG. 3, the electronic device may calculate the white balance evaluation value based on the target coordinate, the capture coordinate, and the chrominance allowable range (S310). Also, the electronic device may perform the white balance correction with reference to the captured image based on the white balance evaluation value (S312). Referring to FIGS. 7 and 8, processes of calculating the white balance evaluation value and correcting the white balance will be described below.

FIG. 7 is a diagram illustrating a process of calculating a white balance evaluation value according to an embodiment.

FIG. 8 is a flowchart for describing a process of calculating a white balance evaluation value according to an embodiment.

According to an embodiment, when a target coordinate Target[a*, b*], the chrominance allowable range 620, and a capture coordinate Capture[a*, b*] are determined, the electronic device determines whether the capture coordinate is within the chrominance allowable range 620 (S820). When the capture coordinate is in the chrominance allowable range 620, the electronic device determines the white balance evaluation value as 0 (S814), and finishes the white balance correcting process. When the capture coordinate is out of the chrominance allowable range 620, the electronic device performs the process of calculating the white balance evaluation value.

In order to calculate the white balance evaluation value, when the target coordinate Target[a*, b*], the chrominance allowable range 620, and the capture coordinate Capture[a*, b*] are determined, the electronic device defines a reference line 710 connecting the target coordinate to the capture coordinate (S804). The electronic device defines an intersection coordinate Region[a*, b*] at which the reference line 710 and a boundary line of the chrominance allowable range 620 intersect each other (S806). Next, the electronic device calculates a Euclid distance d(t,r) between the target coordinate and the intersection coordinate (S808), and calculates a Euclid distance d(r,c) between the intersection coordinate and the capture coordinate (S810). The electronic device determines the white balance evaluation value e by calculating a ratio of the distance d(r,c) between the intersection coordinate and the capture coordinate with respect to the distance d(t,r) between the target coordinate and the intersection coordinate, as in Equation 2 below.

$$e = \frac{d(r, c)}{d(t, r)} \qquad (2)$$

As shown above, the white balance evaluation value is not determined simply by the geometrical distance between the target coordinate and the capture coordinate, but is determined by a ratio of the capture coordinate exceeding the chrominance allowable range. Thus, the subjective chrominance may be accurately determined, and the natural white balance correction may be provided.

The electronic device corrects the white balance based on the white balance evaluation value. The electronic device may calculate a reference white balance by obtaining R, G, and B values of the achromatic region in the reference region. The electronic device calculates white balance gains Kr, Kg, and Kb such that the color balance in the reference region is R:G:B=1:1:1. The electronic device calculates a maximum value Mx (Mx=max(R, G, B)) from among the R, G, and V values, and calculates the white balance gains as Kr=Mx/R, Kg=Mx/G, and Kb=Mx/B.

According to another embodiment, the electronic device may adjust the white balance gain so as to remain the color of light source, and may adjust the color balance R:G:B. For example, the electronic device may adjust the color balance by applying a certain weight to Kr, Kg, and Kb values.

The electronic device may adjust the values of the white balance gains based on the white balance evaluation value. When the white balance evaluation value is 0, the electronic device may not perform the white balance correction, and when the white balance evaluation value exceeds 0, the electronic device may increase or decrease the white balance gain values according to the white balance evaluation value. For example, the electronic device may multiply the calculation formula of Kr, Kg, and Kb by the value corresponding to the white balance evaluation value.

Figure 9:
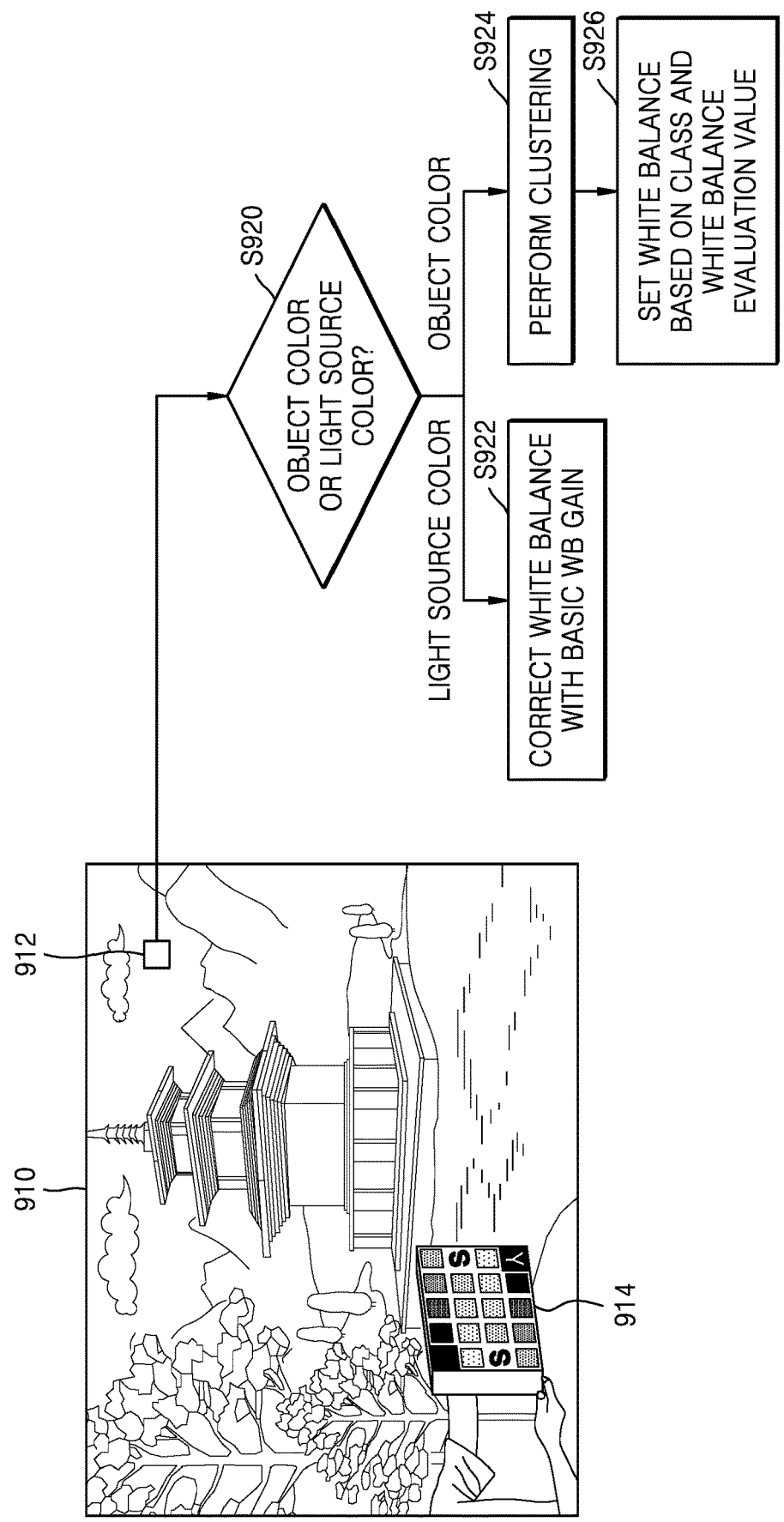
FIG. 9 is a diagram illustrating a process of correcting white balance according to an embodiment.

FIG. 9 is a diagram illustrating a process of correcting white balance according to an embodiment.

Here, the electronic device may perform the white balance correction differently according to whether a region 912 in a captured image 910 is an object color or a light source color. Here, when the region 912 has the light source color, the region 912 is determined as an object of achromatic color, and when the region 912 has the object color, the region 912 is determined as an object of chromatic color. The region 912 of the captured image 910 may correspond to a region obtained by a segmentation based on the object or a block region in the captured image 910 that is partitioned into a plurality of block arrays.

The electronic device determines whether the region 912 in the captured image 910 has the object color or the light source color (S920). The electronic device may determine whether the region 912 has the object color or the light source color based on a color of a reference region 914 in the captured image 910. For example, the electronic device may determine the region 912 having R, G, and B values in the same ratio as those of the reference region 914 as the light source color, and may determine the region 912 having the R, G, and B values in a different ratio from that of the R, G, and B values in the reference region 914 as the object color.

When the region 912 of the captured image 910 corresponds to the light source color, the electronic device performs the white balance correction on the corresponding region based on a basic white balance gain value. The basic white balance gain value corresponds to Kr, Kg, and Kb that are calculated based on the R, G, and B values of the reference region 914, as described above.

When the region 912 of the captured image 910 corresponds to the object color, the electronic device performs a clustering process based on a class representing a type of the object corresponding to the region 912 (S924). The clustering may be performed by extracting information such as a shape, texture, color, etc. from image data of the captured image 910 and determining the class based on the extracted information. The electronic device performs the white balance correction on each of the blocks classified as respective classes (S926). The electronic device may adjust the gain for white balance correction or may adjust the color balance based on the class and the white balance evaluation value. For example, the electronic device may adjust the color balance according to the class and may increase or decrease the size of gain for R, G, and B at the same rate based on the white balance evaluation value.

Figure 10:
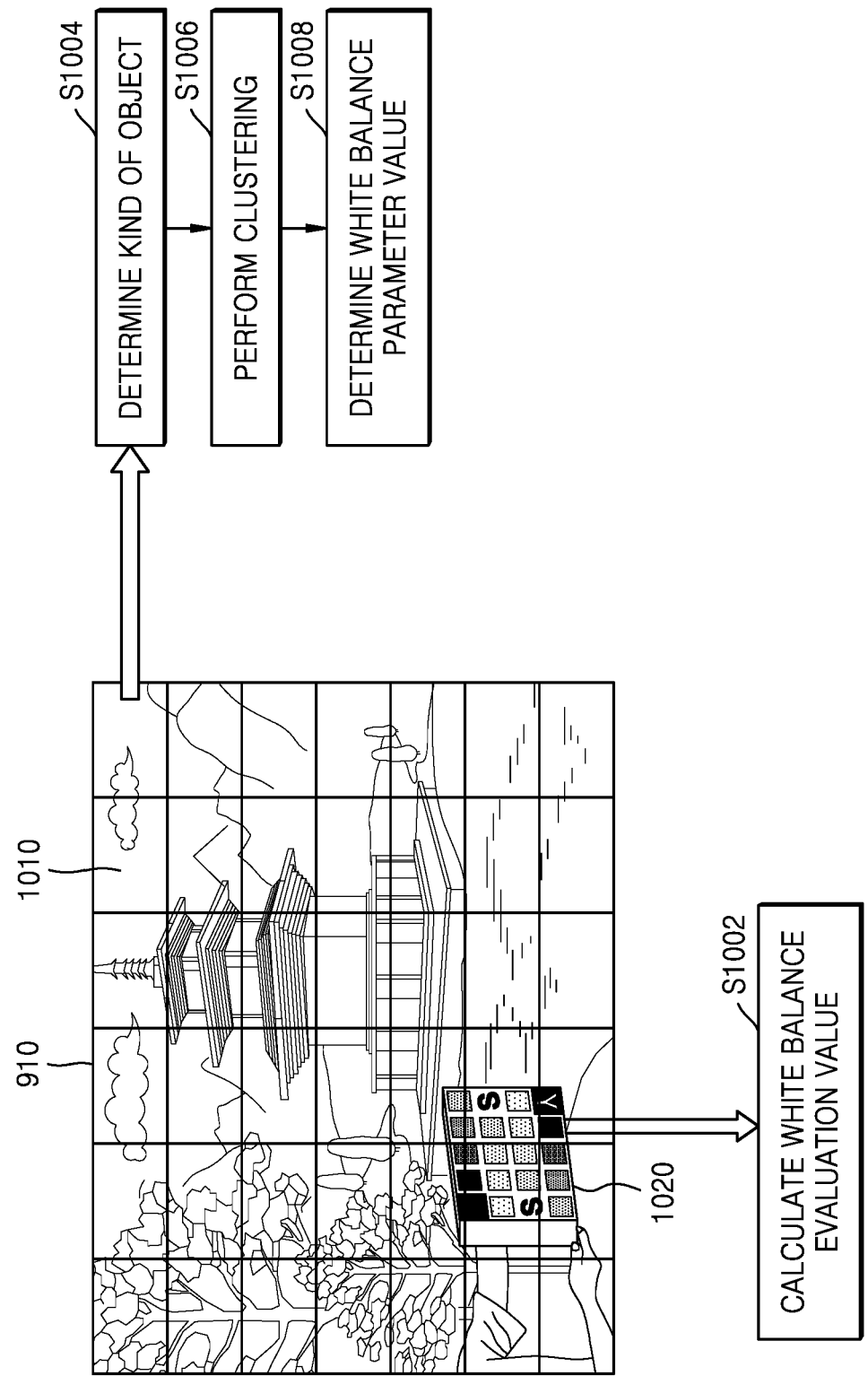
FIG. 10 is a diagram illustrating a process of correcting white balance according to an embodiment.

FIG. 10 is a diagram illustrating a process of correcting white balance according to an embodiment.

According to an embodiment, the electronic device may divide the captured image 910 into a plurality of blocks 1010, and may determine a parameter value of the white balance correction in units of blocks.

The electronic device may estimate the light source color temperature based on a reference region 1020 and determine a target coordinate. Next, the electronic device determines a capture coordinate for each block 1010 in the captured image 910. The electronic device calculates the white balance evaluation value based on the target coordinate and the capture coordinate (S1002).

Next, the electronic device determines a type of the object with respect to each block 1010 in the captured image 910 (S1004). The type of the object may be determined based on image data of each block 1010. When it is determined that a plurality of types of objects are included in one block 1010, the electronic device defines the type of object in the corresponding block 1010 as the object that occupies larger area in the corresponding block 1010. The type of object may be variously defined depending on the captured image, e.g., sky, buildings, plants, water, people, ground, etc.

Next, the electronic device performs a clustering process for determining a class according to the type of the object in each block 1010 (S1006). The class denotes a group of objects for performing the white balance correcting process, and the electronic device performs the white balance correction on the objects of the same class in the same manner. For example, for a class 1, a color balance for reinforcing a G value, that is, increasing a gain of the G value, may be applied, and for a class 2, a color balance for reinforcing a B value, that is, increasing a gain of the B value, may be applied.

Next, the electronic device sets the parameter value of the white balance correction for each block 1010 based on the class determined by performing a clustering process (S1008). The electronic device may set the parameter value of the white balance correction by adjusting the white balance gain that is set based on the reference region 1020, based on the class.

Figure 11:
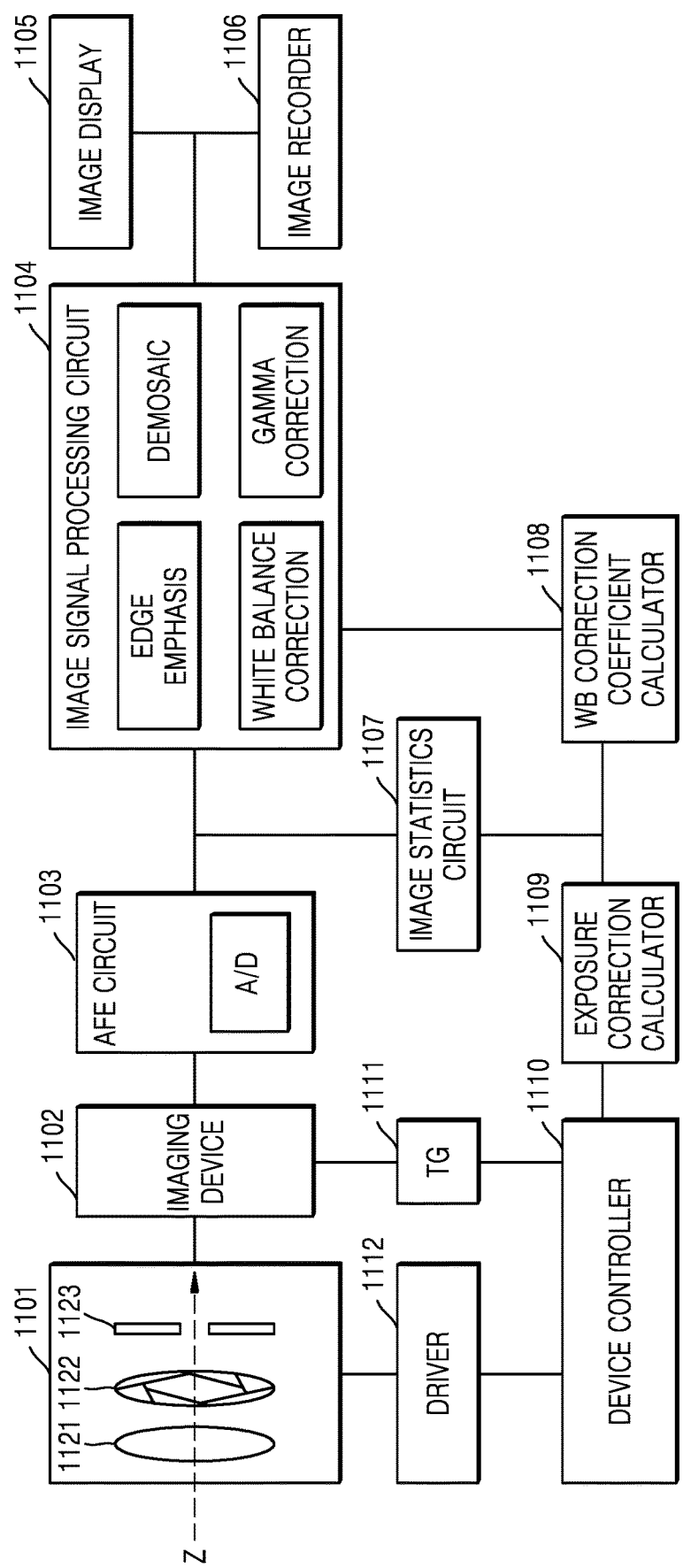
FIG. 11 is a block diagram of an electronic device according to an embodiment.

FIG. 11 is a block diagram of an electronic device 100a according to an embodiment.

The electronic device 100a performs white balance evaluation and correction according to the embodiments of the disclosure. The electronic device 100a of FIG. 11 shows an example of a configuration of the electronic device according to an embodiment.

The electronic device 100a may include a lens optical system 1101, an imaging device 1102, an analog front end (AFE) circuit 1103, an image signal processing circuit 1104, an image display 1105, an image recorder 1106, an image statistics circuit 1107, a WB correction coefficient calculator 1108, an exposure correction calculator 1109, a device controller 1110, a timing generator (TG) 1111, and a driver 1112.

In the electronic device 100a, the lens optical system 1101, the imaging device 1102, the driver 1112, and the TG 1111 may correspond to the camera 110 of FIG. 1. The image signal processing circuit 1104, the image statistics circuit 1107, the WB correction coefficient calculator 1108, the exposure correction calculator 1109, and the device controller 1110 of FIG. 11 may correspond to the processor 120 of FIG. 1.

The lens optical system 1101 may include a lens 1121, an aperture stop 1122, and a mechanical shutter 1123. The lens optical system 1101 forms an image of an object on an imaging surface of the imaging device 1102.

The lens 1121 refracts light and focuses the object on the imaging surface of the imaging device 1102. The lens 1121 is not limited to one lens, but may include a plurality of lenses. Also, in FIG. 11, the lens 1121 is arranged only on an object side rather than the aperture stop 1122, but some of the lens 1121 may be arranged between the aperture stop 1122 and the mechanical shutter 1123.

The aperture stop 1122 blocks the light to only transmit some of incident light in order to adjust intensity of passing light. In detail, the aperture stop 1122 may adjust the intensity of light passing therethrough, by changing a size of a hole transmitting the light.

The mechanical shutter 1123 is open during an exposure time of photographing, and blocks the light otherwise. The mechanical shutter 1123 may be open according to a shutter release signal.

The imaging device 1102 is a device converting incident light into an electrical signal. For example, the imaging device 1102 may include an image sensor such as a charge coupled device (CCD), a complementary metal oxide semiconductor (CMOS), etc. The imaging device 1102 performs an imaging operation based on a driving signal output from the TG 1111. Also, the imaging device 1102 outputs an electrical signal of a captured image to the AFE circuit 1103.

In addition, the imaging device 1102 includes a color filter array for converting light of each color (wavelength band) to an electrical signal. For example, in the imaging device 1102, a plurality of devices are arranged two-dimensionally. In addition, a filter for transmitting one color light and blocking other color light is arranged on a front surface of each device.

The AFE circuit 1103 converts the electrical signal from the imaging device 1102 into a digital signal that is suitable for the image signal processing circuit 1104 and the image statistics circuit 1107. For example, the AFE circuit 1103 includes a correlated double sampling (CDS) circuit performing noise reduction on the electrical signal from the imaging device 1102, and an analog/digital (A/D) conversion circuit for converting an analog signal to a digital signal. Also, the AFE circuit 1103 outputs a digital image signal that is generated through certain signal processes to the image signal processing circuit 1104.

The image signal processing circuit 1104 performs a demosaic process, an edge emphasis process, a WB correcting process, a gamma correcting process, etc. on the image signal output from the AFE circuit 1103. Also, the image signal processing circuit 1104 outputs the image signal after being processed to at least one of the image display 1105 or the image recorder 1106. For example, the image signal processing circuit 1104 performs an AWB correcting process by multiplying the image signal by the white balance gain.

The image display portion 1105 displays the captured image. For example, the image display 1105 may include a liquid crystal display (LCD), an organic light-emitting diode (OLED) display, etc.

The image recorder 1106 is a memory for recording image data. The image recorder 1106 may store image data and other information related to white balancing on image data.

The image statistics circuit 1107 calculates a statistical value of a captured image area or a part of the captured image area with respect to the image signal that is converted into the digital signal by the AFE circuit 1103. Also, the image statistics circuit 1107 outputs the statistical value to the WB correction coefficient calculator 1108 and the exposure correction calculator 1109. The statistical value output from the image statistics circuit 1107 may include, for example, a quantity of received light for each wavelength region.

The WB correction coefficient calculator 1108 calculates the WB correction coefficient of the image based on the statistical value. In addition, the WB correction coefficient calculator 1108 outputs the WB correction coefficient to the image signal processing circuit 1104. For example, the WB correction coefficient calculator 1108 calculates the white balance gain by dividing the image into blocks and by determining whether each block has an object color or a light source color based on R, G, and B values, luminance, etc. of each block.

To determine whether each block has the object color or the light source color, a color space conversion is performed for each block and the objects of the corresponding block are clustered (according to the types of objects) based on the coordinate location, luminance, etc. Here, there may be many design parameters, such as a minimum physical quantity that is a basis of the determination, a weight coefficient indicating which degree of contribution is used to evaluate the blocks classified as each class, target R, G, B values determining what color balance is to be processed from the R, G, and B values of the block for each class, etc.

Such above design parameters do not have the same set values because of different spectral sensitivities when imaging sensors of different types are used, and thus, the design parameters need to be tuned for each product. In the tuning, various scenes of an object are photographed under various light sources, and then results are identified and tuning is repeatedly performed.

In order to obtain the design parameters through the repeated tuning operations, the white balance of high image quality may not be obtained unless a tuning expert works on the tuning operation for days. For example, because there are quite large number of parameter items (hundreds of items) and there is a correlation among various parameters, it is difficult to set an optimal value of the parameter value manually.

According to an embodiment, the electronic device 100a repeatedly performs calculation of design parameters and evaluation of simulations by using an automatic adjustment system established on a calculation device based on learning data (RAW image and right white balance gains) prepared in advance, and thus, may automatically calculate AWB design parameters.

In order to adjust the AWB design parameter automatically, images that become the learning data are prepared based on captured images of various scenes under various light sources (clear sky, cloudy sky, dark places, fluorescent light, LED, bulbs, etc.) Here, RAW data imaging is performed after placing a gray scale chart on a part of the image in order to easily obtain an appropriate white balance gain for the scene.

When the photographing is finished, a white balance may be calculated by obtaining R, G, and B values of an achromatic color patch in the gray scale chart from the image. In a scene in which the white balance is set, the white balance gains Kr, Kg, and Kb are calculated such that the color balance is R:G:B=1:1:1. For example, Kr, Kg, and Kb are calculated as Mx=max(R, G, B), Kr=Mx/R, Kr=Mx/G, Kr=Mx/B. Also, a white balance gain may be set to remain the light source color.

The electronic device 100a may apply the white balance evaluation method described above to a target coordinate range of the right color balance. That is, the electronic device 100a estimates the light source color temperature of the captured image, and then corrects the white balance such that the color balance of the captured image is within the target coordinate range corresponding to the color temperature of the light source shown in FIG. 5.

The exposure correction calculator 1109 calculates exposure correction information (shutter speed, aperture stop, sensitivity) based on the statistical value. In addition, the exposure correction calculator 1109 outputs the exposure correction information to the device controller 1110.

The device controller 1110 controls the TG 1111 and the driver 1112 for controlling the lens optical system 1101 and the imaging device 1102. Specifically, the device controller 1110 may control the driver 1112 according to the shutter speed, the aperture stop, and the sensitivity calculated by the exposure correction calculator 1109.

The TG 1111 generates a timing signal for driving the imaging device 1102. Also, the TG 1111 outputs a driving signal to the imaging device 1102 based on the timing signal.

The driver 1112 drives the lens of the lens optical system, the aperture stop, and the shutter according to a control signal of the device controller 1110.

As described above, the white balance of the image may be corrected and the captured image may be adjusted to have the color that suits the taste of the photographer based on the white balance evaluation, in which a color that is easily recognizable by a person and a color that is difficult to recognize by a person may be distinguished and determined whether to be included in the allowable range.

Also, the automatic calculation of the AWB design parameter value may be stabilized, and the white balance performance of the photographing apparatus using the parameter may be improved.

In addition, high precision of the white balance correcting function in a smartphone camera may be achieved by using the white balance evaluation method described above, prior to evaluation of an algorithm and performance of the white balance design in the smartphone camera.

In the embodiments, each block in FIG. 11 may correspond to at least one software processing block or at least one exclusive hardware processor, and a combination thereof. The image signal processing circuit 1104, the image statistics circuit 1107, the device controller 1110, the exposure correction calculator 1109, and the WB correction coefficient calculator 1108 are examples of software processing units for implementing the embodiments, and the processing units implementing the embodiments may be defined in various ways in addition to the processing units. Also, each block in FIG. 11 may include a central processing unit (CPU), a memory, and other circuits as hardware, and may be implemented by programs, etc. loaded on the memory as software. Therefore, the block may be realized in various forms by one of the hardware or software, or a combination thereof.

Figure 12:
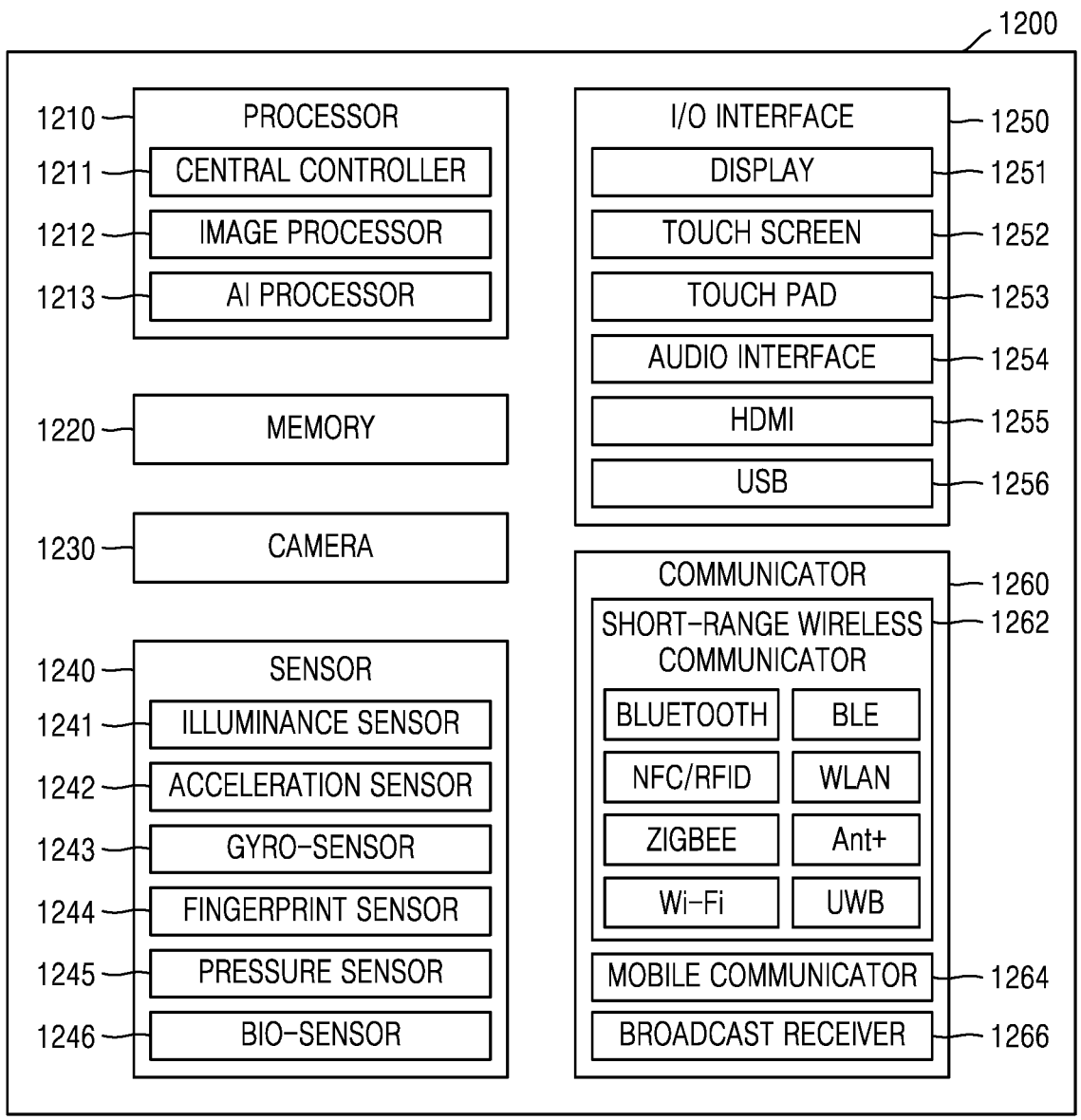
FIG. 12 is a block diagram of an electronic device according to an embodiment.

FIG. 12 is a block diagram of an electronic device 1200 according to an embodiment.

Here, the electronic device 100 may be implemented in various forms, and FIG. 12 shows an example of a structure of the electronic device 1200. The electronic device 1200 may include a processor 1210, a memory 1220, a camera 1230, a sensor 1240, an input/output interface 1250, and a communicator 1260. The camera 110 in the electronic device 100 of FIG. 1 may correspond to the camera 1230 in the electronic device 1200 of FIG. 12, and the processor 120 in the electronic device 100 of FIG. 1 may correspond to the processor 1210 in the electronic device 1200.

The processor 1210 may include at least one processor. The processor 1210 may include a dedicated processor such as a central controller 1211, an image processor 1212, an AI processor 1213, etc.

The memory 1220 may include a volatile storage medium, a non-volatile storage medium, or a combination thereof. Also, the memory 1220 may include various kinds of memories, such as a main memory, a cache memory, a register, a non-volatile memory, etc. The memory 1220 may be implemented in various types of storage media. The memory 1220 may include a storage medium of at least one of a flash memory type, a hard disk type, a multimedia card micro type, a card type memory (e.g., an SD or XD memory, etc.), random access memory (RAM), static RAM (SRAM), read-only memory (ROM), electrically erasable programmable ROM (EEPROM), programmable ROM (PROM), a magnetic memory, a magnetic disk, or an optical disk, or a combination thereof.

The sensor 1240 may include various kinds of sensors. The sensor 1240 may include, for example, an illuminance sensor 1241, an acceleration sensor 142, a gyro-sensor 1243, a fingerprint sensor 1244, a pressure sensor 1245, or a bio-sensor 1246, or a combination thereof. A signal detected by the sensor 1240 is input to the processor 1210, and the processor 1210 may process the detected signal by performing operations, such as adjustment of display brightness, adjustment of camera brightness, motion detection, device orientation detection, fingerprint recognition, bio-signal detection and processing, biometric recognition, etc.

The input/output interface 1250 may include various kinds of input/output interfaces. The input/output interface 1250 may include, for example, a display 1251, a touch screen 1252, a touch pad 1253, an audio interface 1254, an HDMI 1255, a USB 1256, or a combination thereof. The input/output interface 1250 may include various kinds of input/output components. The processor 1210 may perform processes such as gesture recognition, voice recognition, etc. based on the signal input from the input/output interface 1250.

The communicator 1260 may include at least one of a short-range wireless communicator 1262, a mobile communicator 1264, or a broadcast receiver 1266, or a combination thereof. The communicator 1260 may include various kinds of communication modules. The short-range wireless communicator 1262 may perform communication through Bluetooth communication, near field communication, radio frequency identification (RFID) communication, wireless local area network (WLAN) communication, ZigBee communication, an infrared data association (IrDA) communication, Wi-Fi direct (WFD) communication, ultra wideband (UWB) communication, Ant+ communication, or a combination thereof. The electronic device 1200 may communicate with various external devices via the communicator 1260. The electronic device 1200 may exchange data and control signals by communicating with a server, another mobile device, a wearable device, another PC, etc. via the communicator 1260.

In addition, one or more embodiments of the disclosure may be implemented as S/W programs including instructions stored in a computer-readable storage medium. Also, one or more embodiments of the disclosure may be implemented as a computer-readable storage medium storing a computer program.

A computer is a device capable of fetching instructions stored in a storage medium and operating according to the instructions, and may include the electronic device according to one or more embodiments of the disclosure.

The computer-readable storage medium may be provided in the form of a non-transitory storage medium. Here, the term "non-transitory" may mean that the storage medium is a tangible device, and may not include a signal, but this term does not differentiate between where data is semi-permanently stored in the storage medium and where the data is temporarily stored in the storage medium.

Also, the electronic device and the operating method thereof according to one or more embodiments of the disclosure may be included in a computer program product. The computer program product may be traded between a seller and a buyer as a product.

The computer program product may include a S/W program, or a computer-readable storage medium on which the S/W program is stored. For example, the computer program product may include a product (e.g., a downloadable app) in the form of a S/W program that is electronically distributed through a manufacturer of the electronic device or an electronic market (e.g., Google Play Store or App Store). For electronic distribution, at least a part of a S/W program may be stored in a storage medium or temporarily generated. In this case, the storage medium may include a server of a manufacturer, a server of an electronic market, or a storage medium of a relay server that temporarily stores a S/W program.

The computer program product may include a storage medium of a server or a storage medium of a terminal in a system including the server and the terminal (e.g., an electronic device, a portable electronic device, a wearable device, etc.) Alternatively, when there is a third device (e.g., smartphone) communicating with the server or the terminal, the computer program product may include a storage medium of the third device. Alternatively, the computer program product may include a S/W program itself that is transferred from the server to the terminal or the third device, or from the third device to the terminal.

In this case, one of the servers, the terminal, and the third device may execute the computer program product to perform the method according to the embodiments of the disclosure. Alternatively, two or more of the servers, the terminal, and the third device may execute the computer program product to implement the method according to the embodiments of the disclosure in a distributed manner.

For example, the server (e.g., a cloud server, an AI server, etc.) may execute the computer program product stored in the server, and may control the terminal communicating with the server to execute the method according to the embodiments of the disclosure.

In another example, the third device may execute the computer program product and may control the terminal communicating with the third device to execute the method according to the embodiments of the disclosure. In detail, the third device may remotely control the electronic device to perform the method of operating the electronic device.

When the third device execute the computer program product, the third device downloads the computer program product from the server and executes the computer program product. Alternatively, the third device may execute the computer program product provided in a preloaded state to perform the method according to the embodiments of the disclosure.

According to the embodiments of the disclosure, the electronic device for providing a natural white balance correcting process according to a light source, the image processing method, and the storage medium for storing computer programs may be provided.

According to the embodiments of the disclosure, the electronic device for providing a white balance evaluation method for reducing a gap between objective evaluation and subjective evaluation on a white balance correction result to improve quality of a white balance correcting process, the image processing method, and the storage medium for storing computer programs may be provided.

The embodiments of the disclosure are described above with reference to accompanying drawings. It will be understood by one of ordinary skill in the art that the embodiments may be implemented in different forms from the above described embodiments without changing technical features or essential characteristics of the disclosure. The embodiments herein are only examples and should not be construed as limiting the scope of the disclosure.

What is claimed is:

1. An electronic device comprising:
a camera configured to capture an image and generate an image signal by photoelectrically converting incident light; and
at least one processor configured to:
estimate a light source color temperature based on image data of the image signal,
identify a target coordinate on a color space based on the light source color temperature,
identify a capture coordinate on the color space based on the image, identify a chrominance allowable range based on the target coordinate,
obtain a white balance evaluation value based on a first distance between the target coordinate and the chrominance allowable range and a second distance between the capture coordinate and the chrominance allowable range, and
perform a white balance correction on the image based on the white balance evaluation value,
wherein in order to identify the chrominance allowable range, the at least one processor is further configured to, identify, based on the target coordinate, a distance in an amber direction, a distance in a magenta direction, a distance in a blue direction, and a distance in a light green direction.

2. The electronic device of claim 1, wherein the chrominance allowable range is a region in the color space,
wherein the target coordinate is in the chrominance allowable range, and
wherein the at least one processor is further configured to identify a straight line connecting the target coordinate and the capture coordinate, and obtain the first distance between the target coordinate and the chrominance allowable range and the second distance between the capture coordinate and the chrominance allowable range on the straight line.

3. The electronic device of claim 2, wherein the at least one processor is further configured to obtain the white balance evaluation value based on a ratio of the second distance to the first distance.

4. The electronic device of claim 1, wherein the at least one processor is further configured to:
identify a reference region in the image, and
estimate the light source color temperature based on image data of the reference region.

5. The electronic device of claim 4, wherein the reference region is an achromatic region in the image including an achromatic color patch.

6. The electronic device of claim 1, wherein the chrominance allowable range is identified such that a first diameter in the blue direction and the amber direction is longer than a second diameter in the light green direction and the magenta direction in the color space.

7. The electronic device of claim 1, wherein the chrominance allowable range is identified in different ranges depending on the light source color temperature.

8. The electronic device of claim 1, wherein the chrominance allowable range is identified by reflecting a plurality of evaluation scores with respect to white balance of the image.

9. The electronic device of claim 1, wherein the color space comprises a CIE LAB color space including an L* axis corresponding to a reflectivity, an a* axis corresponding to a red direction and a green direction, and a b* axis corresponding to a yellow direction and the blue direction.

10. The electronic device of claim 1, wherein the at least one processor is further configured to identify whether a color of each region in the image is one from among an object color and a light source color, and perform the white balance correction based on the color of each region being one from among the object color and the light source color.

11. The electronic device of claim 1, wherein the at least one processor is further configured to:
divide the image into a plurality of blocks,
identify a type of an object in each of the plurality of blocks,
perform clustering to form at least one class corresponding to the type of the object, and
identify a white balance parameter value based on the white balance evaluation value and the at least one class.

12. The electronic device of claim 1, wherein the at least one processor is further configured to identify whether the capture coordinate is in the chrominance allowable range,
wherein, based on identifying that the capture coordinate is in the chrominance allowable range, identify the white balance evaluation value as 0, and
wherein, based on identifying that the capture coordinate is out of the chrominance allowable range, obtain the white balance evaluation value based on the first distance between the target coordinate and the chrominance allowable range and the second distance between the capture coordinate and the chrominance allowable range.

13. An image processing method comprising:
estimating a light source color temperature based on image data of an image captured by a camera;
identifying a target coordinate on a color space based on the light source color temperature;
identifying a capture coordinate on the color space based on the image;
identifying a chrominance allowable range based on the target coordinate;
obtaining a white balance evaluation value based on a first distance between the target coordinate and the chrominance allowable range and a second distance between the capture coordinate and the chrominance allowable range; and
performing a white balance correction on the image based on the white balance evaluation value,
wherein the identifying of the chrominance allowable range comprises identifying, based on the target coordinate, a distance in an amber direction, a distance in a magenta direction, a distance in a blue direction, and a distance in a light green direction.

14. The image processing method of claim 13, wherein the chrominance allowable range is a region in the color space,
wherein the target coordinate is in the chrominance allowable range, and
wherein the image processing method further comprises identifying a straight line connecting the target coordinate and the capture coordinate and obtaining the first distance between the target coordinate and the chrominance allowable range and the second distance between the capture coordinate and the chrominance allowable range on the straight line.

15. The image processing method of claim 14, wherein the obtaining the white balance evaluation value comprises identifying the white balance evaluation value based on a ratio of the second distance to the first distance.

16. The image processing method of claim 13, wherein the estimating the light source color temperature comprises:
identifying a reference region in the image, and
estimating the light source color temperature based on image data of the reference region.

17. The image processing method of claim 16, wherein the reference region is an achromatic region in the image including an achromatic color patch.

18. The image processing method of claim 13, wherein the chrominance allowable range is identified such that a first diameter in the blue direction and the amber direction is longer than a second diameter in the light green direction and the magenta direction in the color space.

19. A non-transitory computer-readable storage medium having stored therein a computer program for executing an image processing method, when executed by a processor, the processor is configured to:
estimate a light source color temperature based on image data of an image captured by a camera;
identify a target coordinate on a color space based on the light source color temperature;
identify a capture coordinate on the color space based on the image;
identify a chrominance allowable range based on the target coordinate;
obtain a white balance evaluation value based on a first distance between the target coordinate and the chrominance allowable range and a second distance between the capture coordinate and the chrominance allowable range; and
perform a white balance correction on the image based on the white balance evaluation value,
wherein the identifying of the chrominance allowable range comprises identifying, based on the target coordinate, a distance in an amber direction, a distance in a magenta direction, a distance in a blue direction, and a distance in a light green direction.

* * * * *